(12) United States Patent
Krause et al.

(10) Patent No.: US 10,336,396 B2
(45) Date of Patent: Jul. 2, 2019

(54) BICYCLE HANDLE

(71) Applicant: RTI Sports GmbH, Koblenz (DE)

(72) Inventors: Andreas Krause, Koblenz (DE); Jan Holzschuher, Koblenz (DE); Franc Arnold, Koblenz (DE)

(73) Assignee: ERGON INTERNATIONAL GMBH, Koblenz (DE)

( * ) Notice: Subject to any disclaimer, the term of this patent is extended or adjusted under 35 U.S.C. 154(b) by 5 days.

(21) Appl. No.: 15/621,679

(22) Filed: Jun. 13, 2017

(65) Prior Publication Data

US 2017/0355417 A1   Dec. 14, 2017

(30) Foreign Application Priority Data

Jun. 14, 2016   (DE) .................... 20 2016 003 699 U

(51) Int. Cl.
*B62K 21/14*   (2006.01)
*B62K 21/26*   (2006.01)

(52) U.S. Cl.
CPC .............. *B62K 21/26* (2013.01); *B62K 21/14* (2013.01); *Y10T 16/466* (2015.01); *Y10T 74/20828* (2015.01)

(58) Field of Classification Search
CPC ...... B62K 21/26; B62K 21/125; B62K 21/14; B62K 23/04; B62K 23/02; B62K 11/14; Y10T 74/20828; Y10T 16/466; Y10T 16/44; Y10T 428/1393; B25G 1/102; A63B 60/14
See application file for complete search history.

(56) References Cited

U.S. PATENT DOCUMENTS

| | | | |
|---|---|---|---|
| 6,615,687 B2 * | 9/2003 | Bendetti | B62K 21/26 74/551.8 |
| 6,652,941 B1 * | 11/2003 | Chadwick | B32B 7/02 428/35.7 |
| 6,681,653 B2 * | 1/2004 | Yu | B62K 21/26 403/362 |
| RE41,098 E | 2/2010 | Yu | |
| 2007/0157758 A1 * | 7/2007 | Shih | B62K 21/26 74/551.9 |
| 2008/0156139 A1 | 7/2008 | Lai | |
| 2011/0041646 A1 * | 2/2011 | Huang | B62K 21/26 74/551.9 |
| 2011/0277586 A1 * | 11/2011 | Yu | B62K 21/26 74/551.9 |

FOREIGN PATENT DOCUMENTS

| | | |
|---|---|---|
| EP | 1537014 A1 | 6/2005 |
| NL | 1026246 C2 | 11/2005 |

OTHER PUBLICATIONS

German Search Report dated Mar. 2, 2017 for German application No. 20 2016 003 699.9.

* cited by examiner

*Primary Examiner* — Jeremy R Severson
(74) *Attorney, Agent, or Firm* — Ohlandt, Greeley, Ruggiero & Perle, LLP

(57) ABSTRACT

A bicycle handle has an inner sleeve surrounded by a handle element. In a clamping region, the inner sleeve is surrounded by a clamping element, in particular in a clip-like manner. The clamping element is at least partly surrounded by a protective sleeve, wherein it is preferred that the protective sleeve is surrounded with softer material, in particular the material of the handle element.

21 Claims, 2 Drawing Sheets

BICYCLE HANDLE

BACKGROUND

1. Field of the Disclosure

The disclosure relates to a bicycle handle.

2. Discussion of the Background Art

For the purpose of fastening bicycle handles on bicycle handlebars it is known that bicycle handles comprise an inner sleeve of a typically rather hard material. The inner sleeve is surrounded, e.g. overmolded, by a handle element of a softer material. In an outer portion of the bicycle handle the inner sleeve is not surrounded by the handle element. In this portion the sleeve is surrounded by a clip-like clamping element. Since the inner sleeve is slit in the longitudinal direction, it is possible to clampingly fix the bicycle handle on the handlebar using the clamping element. In this regard it is known e.g. from EP 04 764 244.2 to give the clip-like clamping element an exterior design such that the outer side of the handle element passes smoothly into the clamping element and the clamping element can thus be clasped together with the bicycle handle when the same is gripped. In particular with bicycle handles whose clamping elements are arranged on the outer side of the handlebar when in the mounted state, there is a disadvantage that, if the handle is gripped relatively far outside, the ball of the thumb is supported on the clip made of a hard material such as aluminum or another metal. This is particularly disadvantageous since a dampening is desirable especially in this region of the hand.

Further, it is known from US 2011/0277586 to cover the clamping element with a protrusion formed integrally with the handle element. This is a protrusion of soft material corresponding to the material of the handle element. Accordingly, the same is easy to deform and may as a result be inverted inward when the hand is shifted on the bicycle handle. Providing such a protrusion integrally formed with the handle element, which surrounds the clamping element or the clamping clip in the manner of a soft sleeve, in particular has the disadvantage that the sleeve forms no connection with the clamping clip and therefore it slips or is displaceable on the outer side of the clip. Thus, no safe gripping is possible.

Moreover, a bicycle handle having a hard inner sleeve is known from US 2007/0157758, which sleeve is surrounded by a gripping element of softer material. The harder inner sleeve has a larger width so that a clamping region is formed on one side. In the clamping region the inner sleeve has a plurality of radially extending slits. This region is surrounded by a clip-like clamping element which is additionally surrounded by a protective element or a sleeve. This outer sleeve is retained by the screw that fixes the clamping element. In this case, this protective element is a separate element surrounding the sleeve. Since the same is not connected to the handle element, no good gripping comfort is achieved. Further, assembly is difficult.

It is an object of the present disclosure to provide a bicycle handle in which the comfort is improved in particular in the region of a clamping element.

SUMMARY

The bicycle handle of the present disclosure has an inner sleeve that is surrounded by a handle element made in particular of a material that is softer than the inner sleeve. Further, the inner sleeve has a clamping portion which is in particular entirely surrounded by a clamping element. The clamping element serves to clampingly fasten the bicycle handle on the bicycle handlebar. According to the disclosure the clamping element is at least partly surrounded by a protective sleeve, in particular in the circumferential direction. Along the width, i.e. in the longitudinal direction of the bicycle handle, the protective sleeve preferably extends along the entire width of the clamping element. When gripping the bicycle handle, the clamping element will thus not or only in part serve as a support, even when the bicycle handle is gripped in the region of the clamping element. Thereby, the comfort of the bicycle handle is significantly improved. According to the disclosure, the protective sleeve is connected to the inner sleeve. It is particularly preferred to form the protective sleeve and the inner sleeve integrally and, as such, to preferably manufacture them from the same material. Preferably, the protective sleeve at least partly surrounds the clamping region of the inner sleeve in the circumferential direction. Thereby, a slot-shaped receptacle for the clamping element is formed, which element is preferably designed as a clip.

In a particularly preferred embodiment the protective sleeve is surrounded with a soft material. Specifically, this material is the same material as that of the handle element, wherein it is particularly preferred that an element surrounding the protective sleeve is formed integrally with the handle element. The comfort can be further improved in this manner. Further, it is possible to fixedly connect the element of softer material to the protective sleeve so that, when a hand is moved, a deformation or an inward directed inversion is prevented. In this regard, it is particularly preferred that the handle element is formed integrally with the protrusion or partial region of the handle element that in particular completely surrounds the protective sleeve and that it is made by overmolding. In this respect, it is preferred that the protective sleeve integrally formed with the inner sleeve is overmolded with softer material together with the inner sleeve. Due to this softer material the handle element is formed together with the protrusion that surrounds the protective sleeve. Overmolding further has the advantage that it is possible to achieve a firm connection of the overmolded material, i.e. the handle element and the corresponding protrusion, with the inner sleeve and the protective sleeve.

The clamping element is preferably formed with a clip-like design and preferably surrounds the inner sleeve entirely in the clamping region. Thus, a clamping fixation of the inner sleeve on the bicycle handlebar can be achieved in a simple manner. The clamping element preferably has two mutually spaced protrusions for receiving a clamping means such as a screw. These protrusions, which in the mounted state are in particular directed outward away from the handlebar, in particular comprise a bore provided with a thread and a bore receiving a screw head or the like. By spacing the two protrusions from each other, a slit is formed between them. The width of the slits can be reduced using the clamping means so that the inner sleeve is clampingly fixed on the bicycle handlebar. For this purpose it is particularly preferred that also the inner sleeve has a slit in the clamping region, in order to facilitate the clamping fixation on the bicycle handlebar. In a particularly preferred embodiment the clamping means is configured such that it is arranged completely within the two protrusions. In particular, this is already the case even if the clamping means is not fixed yet. With a clamping means in the form of a screw, the screw head, which may e.g. be designed as a hexagonal socket or an Allen screw head, is thus arranged completely in one of the two protrusions. This has the significant advantage that the clamping element can be arranged in the clamping region in a pre-assembled state, i.e. with the clamping means already in place. Thus, in a preferred embodiment, the clamping means can be inserted from outside into the slit formed between the clamping region of the inner sleeve and the protective sleeve. This may also be done in particular when the handle is already overmolded with the softer material which forms the handle element and surrounds the protective sleeve in particular completely. Assembly is significantly facilitated thereby. Further, an opening in the region of the handle element that surrounds the protective sleeve can be very small, since it is merely necessary to insert an Allen key through an in particular circular opening in order to fix the clamping means, i.e. in particular in order to tighten the screw.

In a further preferred embodiment of the disclosure, the protective sleeve surrounds the clamping element completely, depending on the design of the clamping element. If the clamping element is a clamping element with protrusions for receiving a clamping means, it is preferred that the protective element completely surrounds the clamping element except for these protrusions. However, it is also possible to provide e.g. two rings as the clamping element, which are adapted to be twisted in opposite directions and are slit, for example, and further have a thickening. Twisting will cause deformation and thereby effect clamping. Such a clamping element could in this case be entirely surrounded by the protective sleeve.

Moreover, it is preferred that the protective sleeve is connected to the inner sleeve and is in particular formed integrally. Preferably, the protective sleeve and the inner sleeve are made from the same material in particular one process step. Thereby, it is possible in particular to provide a softer material on the outer side of the protective sleeve, in particular a protrusion of the handle element.

The protective sleeve surrounds the inner sleeve in the clamping region or surrounds the mounted clamping element at least for half the circumference, in particular for at least ¾ of the circumference. If a clamping element with protrusions for receiving the clamping means is provided, the protrusions are arranged in the remaining part. Preferably, the protective sleeve extends over the entire width of the clamping region or over the entire width of the mounted clamping element. Preferably, the clamping element is thus entirely arranged between the clamping region of the inner sleeve and the protective sleeve, except for the protrusions for receiving the clamping means, if provided. In a preferred embodiment the handle element has a protrusion that completely surrounds the protective sleeve in the longitudinal direction as well as in the circumferential direction. Also if a clamping element with protrusions for receiving the clamping means is provided it is preferred in particular that the region or the protrusion of the handle element also surrounds the protrusions of the clamping element. In this regard, a continuous surface is obtained that is made exclusively from the softer material of the handle element. This has the advantage that even when the handle is gripped far out in the region of the clamping element, not the clamping element itself, but a correspondingly soft material is gripped. This increases the gripping comfort.

Between the inner sleeve and the protective sleeve, a slit is preferably provided that is open to the outer side of the bicycle handle or to an edge of the bicycle handle. The clamping element can be inserted into this slit in a simple manner from the outer side, in particular with the clamping means pre-assembled thereto. Since it is particularly preferred that the clamping element and also the protective sleeve are entirely surrounded by the handle element or the protrusion connected to the handle element, it is also possible to thereby improve the retaining of the clamping element prior to fixation in this slit-shaped receptacle. This is the case in particular if the clamping element has protrusions for receiving the clamping means, since the protrusions are in direct contact with the material of the clamping element. In this design, no protective sleeve is provided in the region of the protrusions so that the protrusions are directly surrounded by the clamping element. Due to the softer material preferably used for the clamping element, an adhesive gummed inner side or surface is formed in this region, with which the outer side of the protrusions is in contact.

The inner sleeve of the bicycle handle and preferably also the protective sleeve are made of a harder material than the handle element and in particular the protrusion of the handle element covering the protective sleeve. Suitable materials are PP or PP-GF, for example. It is particularly preferred to manufacture the inner core from a fiber reinforced material, in particular a glass fiber reinforced material such as glass fiber reinforced PP. The material of the handle element itself is softer, with e.g. TPE being a possible material for that purpose. In particular, overmolding is used to form the handle element, as well as the protrusion preferably connected to the handle element and surrounding the protective element and the clamping element. This results in a good connection between the outer surface of the inner sleeve and the handle element or the outer surface of the protective sleeve and the handle element.

The disclosure will be explained hereunder in detail with reference to a preferred embodiment and to the accompanying drawings.

DETAILED DESCRIPTION OF THE PREFERRED EMBODIMENT

Figure 1:
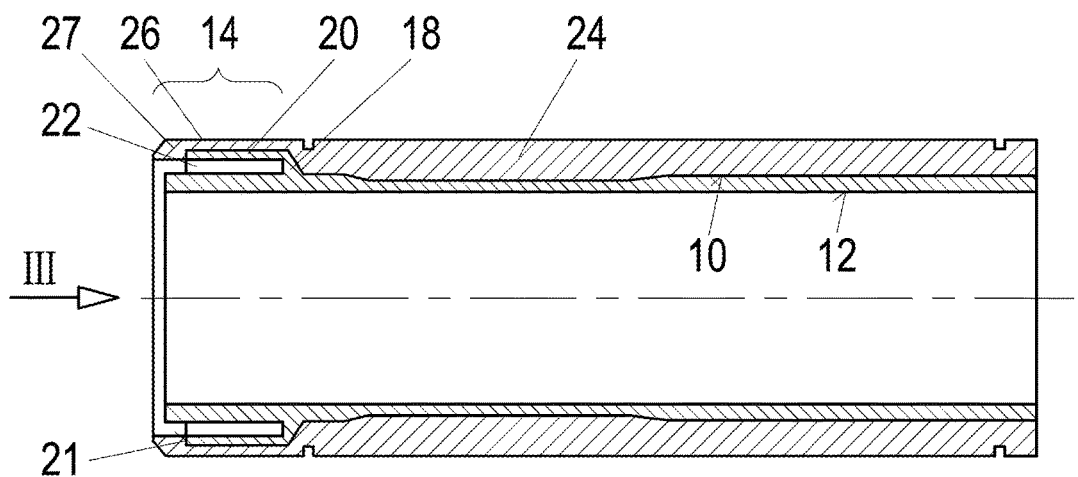
FIG. 1 is a schematic sectional view of a preferred embodiment of the bicycle handle of the disclosure.
Figure 2:
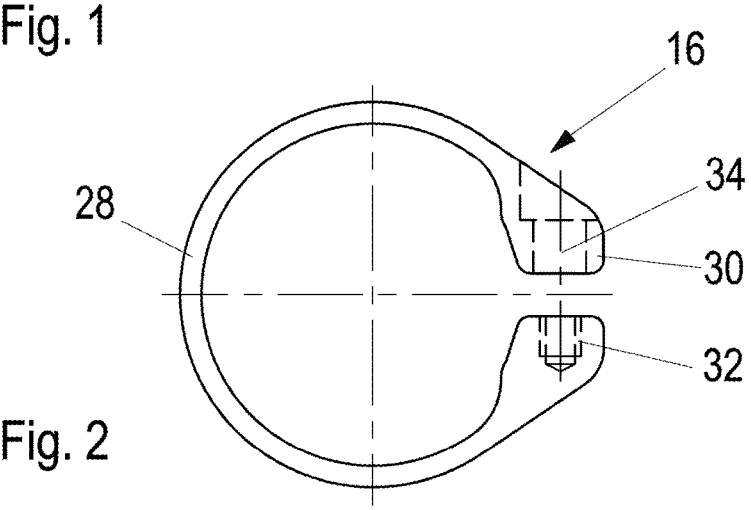
FIG. 2 is a schematic top plan view on a preferred embodiment of the clamping element used.

The bicycle handle of the present disclosure has an inner sleeve 10. The same has a substantially cylindrically shaped inner side 12 whose diameter is slightly larger than the outer diameter of a bicycle handlebar so that the inner sleeve 10 can be slipped on a bicycle handlebar in a simple manner. The embodiment illustrated in FIG. 1 is a bicycle handle which is on the left side when mounted, so that a clamping region 14 is provided in an outer region of the bicycle handle. For a clamping fastening of the bicycle handle on the bicycle handlebar, a clamping element 16 is arranged in the clamping region 14, the clamping element being configured in particular as a clip-like clamp (FIG. 2). The inner sleeve 10 is connected to, in particular formed integrally with a protective sleeve 20 via a web-like connecting element 18.

Figure 3:
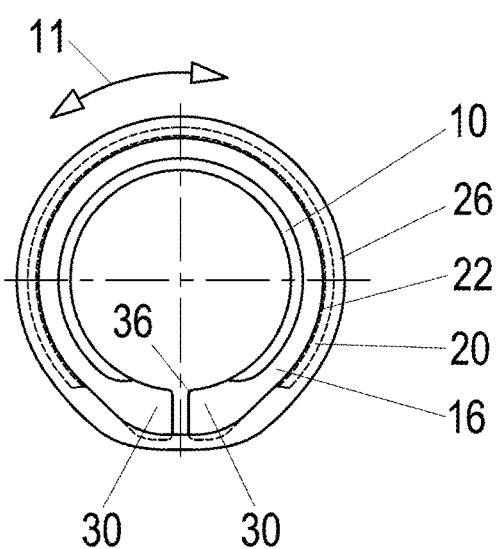
FIG. 3 is a schematic side view of the bicycle handle seen in the direction of the arrow III in FIG. 1 with the clamping element mounted.

In the clamping region 14, the protective sleeve 20 surrounds the same in particular for more than of the circumferential direction (arrow 11 in FIG. 3). In the clamping region 14, a slit 22 of constant width is formed between the protective sleeve 20 and the inner sleeve 10.

Both the inner sleeve 10 and the protective sleeve 20 are surrounded by, in particular overmolded with a handle element 24 of softer material. Thus, the bicycle handle comprises a soft material on its outer side in particular also in the clamping region 14. When providing a protective sleeve 20, it is possible to fixedly connect the material of the handle element 24, i.e. in particular a protrusion 26 of the handle element 24, to an outer side of the protective sleeve 20 in the clamping region. In this manner, this region is prevented from being inverted inward when the hand is moved on the bicycle handle. For this purpose, the protrusion 26 of the handle element 24 further has a radially inward directed projection 27. The same surrounds an outer side 21 of the protective sleeve or abuts on the outer side 21 of the protective sleeve 20.

In the embodiment illustrated, the clamping element is of a clip-like design. The clamping element 16 (FIG. 2) therefore has a partly tubular region 28 which has each of its ends connected to a respective protrusion 30. The protrusion 30 forming a thickening serves to receive a clamping means such as a screw. For this purpose, one of the two protrusions 30 has a thread 32 and the opposite protrusion 30 has a recess 34 for receiving a screw head, in particular completely.

For assembly, the clamping element 16 is inserted into the slit 22 from the left in FIG. 1. A corresponding view on the bicycle handle from the left with the clamping element inserted is shown schematically in FIG. 3 and in perspective in FIG. 4. In this view, an end face of the inner sleeve 10 can be seen, which has a recess or a clamping slit 36 in particular in the region in which the protrusions 30 of the clamping element 16 are arranged in the mounted state. The edge regions of the inner sleeve 10 in the region of the clamping slit 36 are formed in a tapering manner. In particular, these edge regions have a convex curvature 38 on which the concave curvature 40 of the clamping element 16 abuts. The concave curvature 60 of the clamping element 16 is provided in the transition region between the tubular part of the clamping element 16 and the two protrusions 30. The clamping element 16 is arranged in the slit 22. The same is formed by the inner sleeve 10 and the protective sleeve 20 surrounding at least 3 of the inner sleeve. The protective sleeve 20 itself is covered by the protrusion 26 of the handle element 24. For reasons of clarity, FIG. 3 does not show the inward directed projection 27 of the protrusion 26 of the handle element 24, which covers the protective sleeve when seen in side view.

Figure 4:
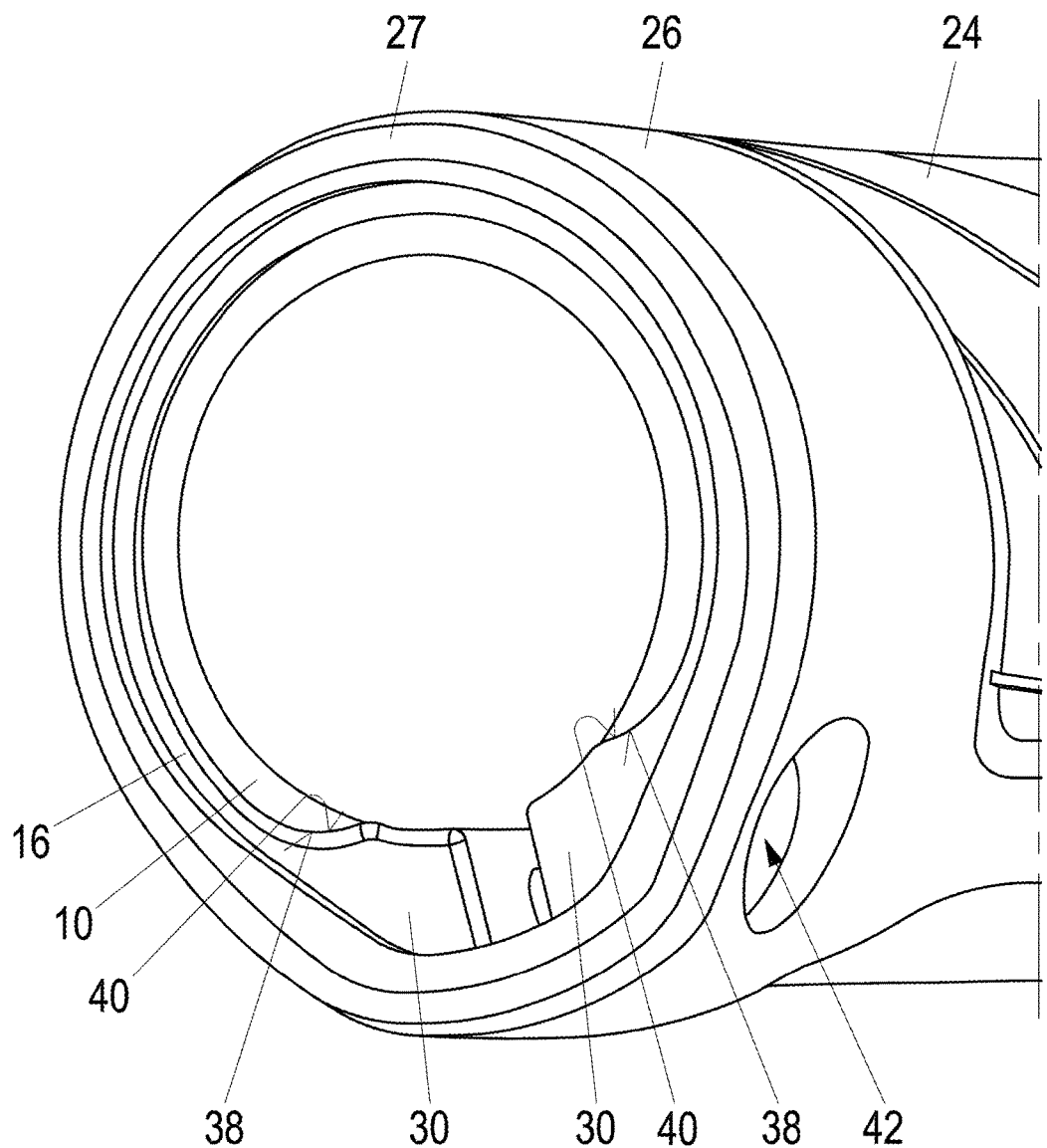
FIG. 4 is a schematic perspective view of the region of the bicycle handle in which the clamping element is arranged.

Further, the perspective view in FIG. 4 shows an opening 42 in the region 26 of the handle element 24. This opening serves in particular for inserting a tool, in particular an Allen key, for tightening the clamping means which is designed in particular as a screw with an Allen screw head.

In the region of the protrusions 30 of the clamping element 16, the protrusions are in direct contact with an inner side of the protrusion 26 of the handle element 24 so that a gummed inner surface is created which causes a further fixation of the clamping element 16 before fixation on the handlebar. Thereby, it is avoided in particular that the clamping element 16 slips out from the slit 22.

What is claimed is:

1. A bicycle handle comprising:
    an inner sleeve,
    a handle element surrounding the inner sleeve, and
    a clamping element which surrounds the inner sleeve in a clamping region,
    wherein the clamping element is at least partly surrounded by a protective sleeve that is connected to the inner sleeve, and
    wherein, between the inner sleeve and the protective sleeve, a slit is formed that is open to the outer side of the bicycle handle and serves to receive the clamping element.

2. The bicycle handle of claim 1, wherein the clamping element is of a clip-like design and surrounds the inner sleeve entirely in the clamping region.

3. The bicycle handle of claim 1, wherein the clamping element has spaced apart protrusions for receiving a clamping means.

4. The bicycle handle of claim 3, wherein the protective sleeve surrounds the clamping element entirely except for the protrusions.

5. The bicycle handle of claim 1, wherein the inner sleeve has a clamping slit in the clamping region.

6. The bicycle handle of claim 1, wherein, in the mounted state, the protective sleeve surrounds the inner sleeve or the clamping element for at least half the circumference.

7. The bicycle handle of claim 6, wherein, in the mounted state, the protective sleeve surrounds the inner sleeve or the clamping element for at least ¾ of the circumference.

8. The bicycle handle of claim 1, wherein the protective sleeve covers the inner sleeve or, when in the mounted state, the clamping element over an entire width.

9. The bicycle handle of claim 1, wherein the handle element covers the protective sleeve.

10. The bicycle handle of claim 1, wherein the inner sleeve is made of a harder material than the handle element.

11. The bicycle handle of claim 10, wherein the protective sleeve is made of a harder material than the handle element.

12. The bicycle handle of claim 1, wherein the handle element covers an outer edge of the protective sleeve at least partly.

13. The bicycle handle of claim 1, wherein the handle element is manufactured by overmolding the inner sleeve, as well as the protective sleeve.

14. The bicycle handle of claim 1, wherein the clamping element surrounds the inner sleeve entirely in the clamping region.

15. The bicycle handle of claim 1, wherein the slit serves to receive the clamping element together with a pre-assembled clamping means of the clamping element.

16. A bicycle handle comprising:
    an inner sleeve,
    a handle element surrounding the inner sleeve, and
    a clamping element which surrounds the inner sleeve in a clamping region,
    wherein the clamping element is at least partly surrounded by a protective sleeve that is connected to the inner sleeve, and
    wherein the handle element fully surrounds the clamping element, when in the mounted state, in the circumferential direction.

17. The bicycle handle of claim 16, wherein the handle element fully surrounds the clamping element, when in the mounted state, over an entire width.

18. A bicycle handle comprising:
    an inner sleeve,
    a handle element surrounding the inner sleeve, and
    a clamping element which surrounds the inner sleeve in a clamping region, wherein the clamping element is at least partly surrounded by a protective sleeve that is integrally formed with the inner sleeve.

19. A bicycle handle comprising:

an inner sleeve, a handle element surrounding the inner sleeve, and a clamping element which surrounds the inner sleeve in a clamping region, wherein the clamping element is at least partly surrounded by a protective sleeve that is connected to the inner sleeve, and wherein the handle element entirely covers the protective sleeve.

20. A bicycle handle comprising:

an inner sleeve, a handle element surrounding the inner sleeve, and a clamping element which surrounds the inner sleeve in a clamping region, wherein the clamping element is at least partly surrounded by a protective sleeve that is connected to the inner sleeve, and wherein the handle element surrounds the protective sleeve.

21. A bicycle handle comprising:

an inner sleeve with a protective sleeve defining a slit between the protective sleeve and the inner sleeve only in a clamping region, a handle element surrounding the inner sleeve, and a clamping element having a clamping protrusion, the clamping element in the slit so that, in the clamping region, the clamping element surrounds the inner sleeve and the protective sleeve entirely surrounds the clamping element except for the clamping protrusion.

\* \* \* \* \*